Figure 1:
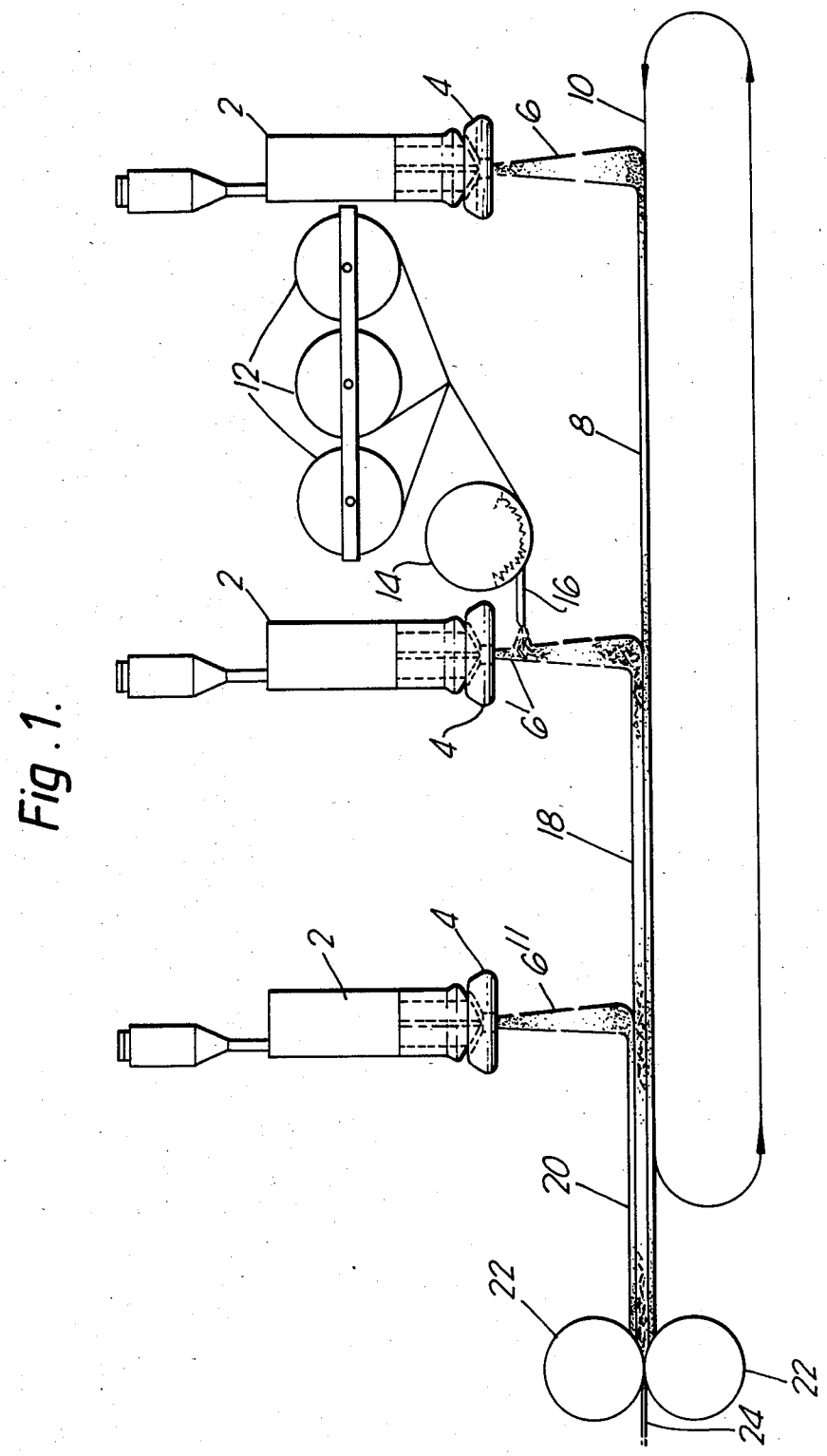

United States Patent [19]

Storey et al.

[11] Patent Number: 4,784,892

[45] Date of Patent: Nov. 15, 1988

[54] LAMINATED MICROFIBER NON-WOVEN MATERIAL

[75] Inventors: Dennis G. Storey; Peter Maddern, both of Maidstone, Great Britain

[73] Assignee: Kimberly-Clark Corporation, Neenah, Wis.

[21] Appl. No.: 862,345

[22] Filed: May 12, 1986

[30] Foreign Application Priority Data

May 14, 1985 [GB] United Kingdom ................ 8512206

[51] Int. Cl.$^4$ ........................ A61F 13/16; D04H 1/54
[52] U.S. Cl. .................................. 428/172; 2/243 A; 15/209 R; 55/527; 55/528; 156/62.4; 156/62.6; 156/62.8; 156/73.1; 156/290; 156/308.4; 210/507; 210/508; 428/198; 428/283; 428/286; 428/287; 428/296; 428/298; 428/302; 428/319.3; 428/326; 428/327; 428/903; 428/913; 604/366; 604/370; 604/372; 604/376; 604/378; 604/380
[58] Field of Search ............... 428/172, 198, 283, 286, 428/287, 296, 298, 302-319.3, 326, 327, 903, 913; 604/366, 370, 372, 376, 378, 380; 156/62.4, 62.6, 62.8, 73.1, 290, 308.4

[56] References Cited

U.S. PATENT DOCUMENTS

| | | | |
|---|---|---|---|
| 3,949,130 | 4/1976 | Sabee et al. ........................ | 428/409 |
| 4,297,410 | 10/1981 | Tsuchiya et al. ................... | 428/283 |
| 4,333,464 | 6/1982 | Nakano ............................... | 428/407 |
| 4,340,556 | 7/1982 | Ciencewicki ........................ | 264/113 |
| 4,426,417 | 1/1984 | Meitner et al. ..................... | 428/195 |
| 4,578,068 | 3/1986 | Kramer et al. ..................... | 428/913 |
| 4,604,313 | 8/1986 | McFarland et al. ................ | 428/286 |

FOREIGN PATENT DOCUMENTS 2151272  7/1985  United Kingdom .

*Primary Examiner*—James C. Cannon
*Attorney, Agent, or Firm*—William D. Herrick

[57] ABSTRACT

Non-woven material useful for example for disposable wipers and the like which comprises a layer of meltblown polymeric microfibers inter-mixed with fibres of absorbent material and/or absorbent or super-absorbent particles, the absorbent fibres and/or particles being inter-connected by and held captive within the polymeric microfibres matrix of fibres by mechanical entanglement and interconnection of the microfibres/absorbent fibres, (when present), and at least one layer of meltblown polymeric microfibres, the layers being bonded together ultrasonically or by the application of heat or heat and pressure to cause the microfibres in one layer to bond to the microfibres in an adjacent layer so as to produce fuse bonds extending through the material.

Such material can readily absorb fluids including oil, and can subsequently be squeezed out readily. The material also has an integral strength and a substantially lint free wiping surface.

4 Claims, 3 Drawing Sheets

LAMINATED MICROFIBER NON-WOVEN MATERIAL

This invention relates to non-woven material useful, for example, for disposable wipers for industrial or domestic purposes, for filtration or for disposable protective clothing.

A material has been disclosed in U.S. Pat. No. 4,100,324 which comprises meltblown polymeric microfibres intermixed with wood pulp fibres, the wood pulp fibres being interconnected by and held captive within the matrix of microfibres by mechanical entanglement and interconnection of the microfibres and wood pulp fibres. The wood pulp fibres may be replaceable by other suitable length fibres of cellulose material e.g. textile fibres. Absorbent or super-absorbent particles may replace the absorbent fibres or be present in addition to absorbent fibres. See also U.S. Pat. No. 4,426,417 and European Patent Application No. 0080382. Such material will hereafter be referred to as "material of the type described".

It is desirable for wipers, for example, to have the ability rapidly to absorb fluids including oil, readily to be squeezed out and subsequently to absorb further fluid without leaving smears on a surface which has been wiped. It is also desirable that the material has an integral strength to prevent break-up of the wiper when wet and to have a substantially lint free wiping surface.

Non-woven material in accordance with this invention which largely satisfies the above desiderata comprises a layer of material of the type described and a layer of meltblown polymeric microfibres (with or without the pulp or fibres being intermixed therewith).

Preferably the material comprises an inner layer of material of the type described sandwiched between two outer layers of meltblown polymeric microfibres. However, the material could comprise a single layer of meltblown polymeric microfibres and a single layer of the material of the type described or an inner layer of meltblown polymeric microfibres sandwiched between two outer layers of the material of the type described. In each case the polymeric microfibres may be bonded together throughout the material as these are present in each of the layers.

A further example of material in accordance with the invention is that having a "top" layer of meltblown polymeric microfibres, having intermittently mixed therewith staple textile fibres to form a soft transfer layer, a second layer of polymeric microfibres intermittently mixed with pulp for absorbent capacity and preferably a backing polymeric film. Such a pad could be used for feminine protection articles, diapers or incontinence products.

The layers may be bonded ultrasonically but are preferably bonded together by the application of heat and pressure through, for example, heated calander rolls having an engraved bond pattern. This causes the microfibres in the outer layer to bond to the microfibres in the central layer so as to produce fuse bonds which extend through the web. An integrally bonded strong web is thus produced with the absorbent fibres or pulp in the centre layer being held firmly anchored in position and prevented from moving to form lumps or bumps.

Alternatively the layers may be bonded together by passing heated air through the material, the temperature of the air being such as to bond the polymeric fibres in the layers to all other contacting fibres.

Such a product has the clean wiping characteristics typical of meltblown materials due to the fact that the surface layers are comprised wholly of polymeric microfibres. The surface layers also give the product a good durability with low linting. The incorporation of the absorbent fibres or pulp in the central or core layer provides economy, high bulk and better fluid absorption and wringability characteristics as compared with wholly meltblown material.

Different materials may be used for the outer layers depending upon the durability or other surface characteristic required. For example, the outer surface may be made of polyester, nylon and polyethelene in various weights and fibre diameters. However, the preferred material for the outer layers is polypropylene. If, for example, polyester fibres are used in the outer layers then the fibres in the centre layer should have the same melting point if the three layers are being bonded by compression using heated rollers. However, different materials may be used if ultrasonic bonding is employed. Thus one could envisage a material having nylon fibres in one outer layer, a central layer including polypropylene fibres and the other outer layer also having fibres of polypropylene or low density polyethylene. Different materials may be used according to the envisaged end use of the resultant laminated product which may extend to drying cloths or fabrics, wipers or for medical applications and protective clothing.

The total weight of the laminated web material in accordance with the invention may vary considerably. A typical weight would be 85 grams per square meter but the weight could, for example, be as low as 50 and as high as 150 gsm. The outer layers may for example have a weight of 15 gsm (with a central layer weight of 55 gsm) but their mimimum weight could be about 10 gsm depending on the requirements of the material. If high absorbency is required then one needs a high bulk content for the centre layer which, for example, could include a wood pulp content of 50 to 80 percent or even more by weight.

However, the fibre content in the centre layer must be such as to allow bonding between the polymeric fibres in the three layers.

The bonding area may be as low as 10 percent or even lower but is preferably about 12½ percent. The bonding area could however be much higher although this would provide a stiffer and much harder product.

The fibre diameters of the polymeric material in the outer layers are, for example, from about 1½ to 10 microns. They may be about say 2½ microns to give a soft surface, useful for wiping sensitive surfaces, which are fairly common in, for example, the electronic industry. If material having higher diameter (say from 4 to 5 microns) fibres in the outer layers, is used, the web material is coarser but has a rather better absorption rate and transfers fluid to the core material where it is retained. Such material may, for example, be used to wipe up printing ink. The fibres in the central layer may not be the same size as those in the outer layer. Normally fibres having 10 microns diameter would be considered as of maximum size.

As an example, the following material has been found to be particularly good as a printer's wipe.

The first layer of wholly meltblown polypropylene microfibres is of 15 gsm. The second or central layer consists of 50 percent by weight of polypropylene meltblown microfibres and 50 percent wood pulp giving a layer of 55 gsm. The third or outer layer is the same as the first layer namely, 100 percent polypropylene meltblown microfibres of 15 gsm. The material is treated with surfactant to provide water absorption properties.

In use the surface of the web has a dry feel due to the fact that the microfibres in the outer layer wick fluid away from the surface into the centre layer. The cellulose in the central layer has a very high natural affinity for water which is absorbed into the fibres, compared with polypropylene which is normally hydrophobic and only retains water between the microfibres through use of a surfactant.

Figure 2:
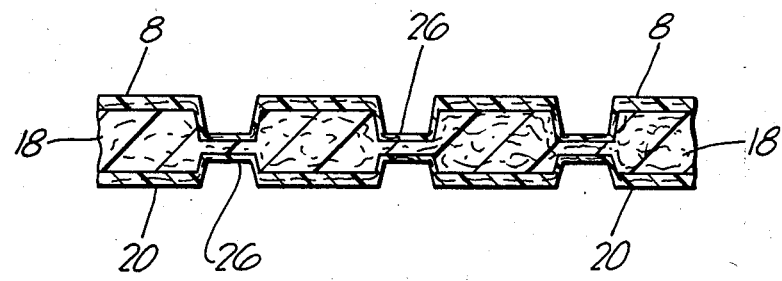

The invention will now be further described by way of example with reference to the accompanying diagrams in which:

FIG. 1 is a schematic view of apparatus suitable for making material in accordance with the invention, and FIG. 2 is a diagrammatic cross-section through material in accordance with the invention.

Referring to FIG. 1 polypropylene is formed through standard formers 2 and issues through the use of standard well-known equipment 4 as meltblown microfibres 6, 6' and 6". The first layer of meltblown microfibres is laid at the righthand end of a forming wire 10, to move from right to left as seen in FIG. 1, to form a flat layer 8 on the wire 10. The central layer is produced partly of the meltblown microfibres 6, and partly of wood pulp which is fed from pulp reels 12 to a rotary pulp picker 14 from which the 'picked' pulp is blown through a nozzle 16 to mingle with the meltblown microfibres 6' to form a layer 18 consisting of an intimate mixture of pulp and meltblown microfibres. The other outer layer 20 is formed by meltblown polypropylene microfibres 6" which are laid on top of the central layer 18 at the lefthand end of the forming wire 10.

The three layers 8, 18 and 20 are then fed between two heated rollers 22, one of which is engraved with a bonding pattern to produce compression points and hence fusion bonds between the polymeric fibres in the three layers which are compressed together to emerge as a single laminate 24.

The resulting material is illustrated in FIG. 2 on a larger scale, and it can be seen that at the bond areas 26 the polymeric fibres in all three layers are fused together to produce strongly bonded material in which the fibres in the centre layer are held captive.

It will be appreciated that the absorbent pulp in the centre layer may be replaced wholly or partly by fibres and/or synthetic pulp such as that made of polyolefin fibrillated pulp available in the form of polyethylene or polypropylene under the trading name "Pulpex" made for example by Lextar, a Solvay-Hercules Company, of Rotterdam, Netherlands. Synthetic pulp as it is thermoplastic may give improved layer bonding.

As an example the three layers may have the following comparative thickness for a laminate having a weight of 85 gsm.

The two outer layers of meltblown microfibres—225 microns.

The centre layer of material of the type described—460 microns comprising 70% pulp 30% polymer.

The outer layers had a weight of 20 gsm with the centre layer having a weight of 45 gsm.

Figure 3:
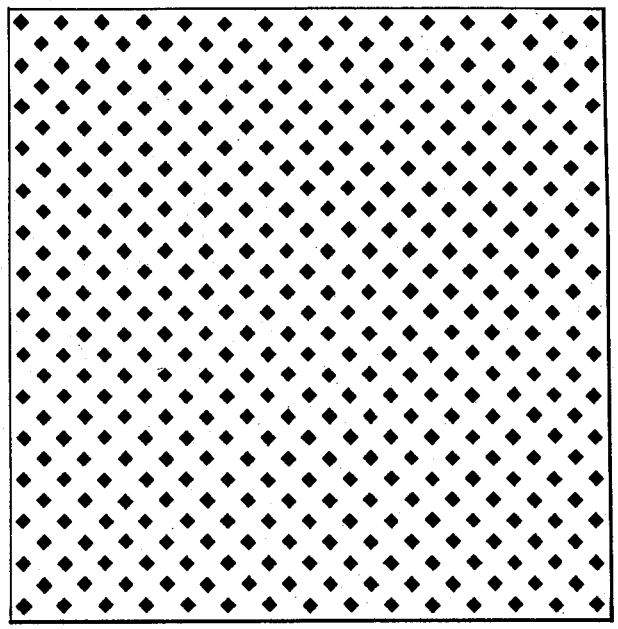
Figure 4:
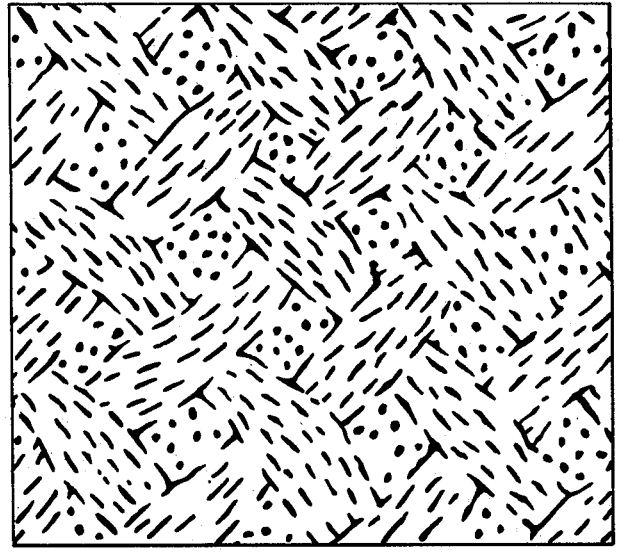

The embossing pattern may be of any convenient shape or pattern e.g. diamond shaped areas as illustrated see FIG. 3 or of areas simulating a woven web see FIG. 4.

The material may, as indicated above, be used for a variety of purposes as follows:

(1) WIPERS

A laminate comprising an abrasion resistant, solvent resistant polyester, polypropylene or nylon meltblown outer layer with an absorbent pulp/polypropylene microfibres centre layer.

(2) WORKWEAR

A fabric structure comprising durable nylon or polyester meltblown outer layers with a textile-like, opaque layer of staple fibres containing polypropylene microfibres for the centre layer.

(3) OTHER APPLICATIONS

Other applications are possible if the laminate has dissimilar outer layers e.g. face mask media, and medical fabrics.

(4) DRYING CLOTH

Nylons or polyester meltblown outer layers for durability and temperature resistance with an absorbent pulp or staple fibre centre layer containing polypropylene microfibres could be used as a disposable tea towel.

An advantage of such a construction would be the ability for moisture to be preferentially transferred to the centre layer, giving relatively "dry" outer surface layers.

The following comparison table is intended to show the relatively high absorbency and "mop-up" capacity of material in accordance with the invention as compared with material made of 100 percent meltblown polymeric material and material comprising two outer layers of material of the type described sandwiching a single central layer of spunbond polymeric material.

| | (FOOD SERVICE WIPER) | | |
|---|---|---|---|
| | MCM | CSC | (100% MELTBLOWN) |
| Basis weight (gsm) | 85 | 80 | 82 |
| Construction | 15/55/15 | 33/14/33 | Pure meltblown |
| Pulp/polymer ratio | 70/30 | 30/70 | 100% Polypropylene |
| Water Absorbency | | | |
| Absorbent capacity (%) | 615 | 675 | 485 |
| Mop-up capacity (%) | 415 | 325 | 250 |

Notes
MCM = material in accordance with the invention
CSC = material of the type described sandwiching a layer of spunbond polymeric fibres.
absorbent capacity = saturated sample weight - dry weight as a percentage of dry weight.
'Mop-up' capacity = saturated sample weight - squeezed out sample weight as a percentage, as a percentage of dry weight.

Absorbent capacity is a measure of the total saturated absorbent capacity of a wiper. 'Mop-up' capacity is a measure of the capacity of a wrung-out wiper to reabsorb water until saturated. It is also a measure of the 'wringability' of a wiper.

CONCLUSIONS

1. MCM laminate has a higher 'mop-up' capacity than 100% meltblown fabric i.e. compared to 100% meltblown fabric when wrung out, a given weight of MCM material has a higher capacity in mopping up water. This is due to the pulp content in the MCM fabric and the voids created by the presence of the pulp in the structure.

2. MCM laminate has a higher 'mop-up' capacity than a CSC laminate containing a high proportion of polypropylene polymer (70%) to have acceptable low-lint performance. This again is due to the high level of pulp in the MCM structure which can be employed without causing linting of the pulp fibres (as these are encapsulated).

The following Table illustrates by way of example the certain characteristics of three examples of material in accordance with the invention:

| MELTBLOWN/COFORM/MELTBLOWN | | | |
|---|---|---|---|
| Construction gsm (layer by layer) | 20/45/20 | 20/45/20 | 15/55/15 |
| Embossing Pattern | DIAM | WOV WEB | DIAM |
| Pulp/Poly (Centre Layer) % | 70/30 | 70/30 | 70/30 |
| Caliper | | | |
| DRY micron | 900 | 863 | 999 |
| WET micron | 899 | 826 | 976 |
| Tensile Strength 6 × 1" | | | |
| MD DRY g | 1628 | 1704 | 1333 |
| CD DRY g | 886 | 906 | 718 |
| MD WET g | 1685 | 1721 | 1283 |
| CD WET g | 879 | 870 | 683 |
| Water Absorbency | | | |
| Rate s | 1 | 1 | 1 |
| Capacity % | 684 | 565 | 793 |
| Mop Up % | 472 | 350 | 558 |
| White Spirit Absorbency | | | |
| Capacity % | 561 | 508 | 730 |
| Mop Up % | 379 | 327 | 456 |
| Oil Capacity | 448 | 366 | 330 |
| Cap Suction % Lint mg/sq.m | 9 | 3 | 2 |

MD = Machine Direction
CD = Cross Direction
DIAM = Diamond
WOV WEB = Woven web

What we claim is:

1. A nonwoven three-layer laminate material having a basis weight in the range of from about 50 to about 150 gsm and consisting essentially of a coform central layer mixture of thermoplastic microfibers having a diameter generally in the range of up to about 10 microns including from about 50 to about 80 percent by weight of pulp fibers and said mixture also including superabsorbent particles held captive within said mixture of pulp and microfibers, and on both sides of said central layer a meltblown surface layer consisting essentially of thermoplastic microfibers having a diameter generally within the range of from about 1½ to 10 microns, said laminate being interbonded by a pattern of fused bonds serving to anchor the superabsorbent particles within said laminate, and occupying at least about 10 percent of the surface area of said laminate.

2. The nonwoven material of claim 1 wherein the thermoplastic material in each layer is polypropylene and said fused bonds are formed by the application of heat and pressure.

3. The nonwoven material of claim 1 wherein the thermoplastic material of each surface layer is made of polyester, nylon, polyethylene or polypropylene, and said fused bonds are formed by sonic bonding.

4. The nonwoven material of claims 1, 2 or 3 also including an impervious film on the outer side of one of said surface layers.

* * * * *

UNITED STATES PATENT AND TRADEMARK OFFICE
CERTIFICATE OF CORRECTION

PATENT NO. : 4,784,892
DATED : November 15, 1988
INVENTOR(S) : Dennis G. Storey, Peter Maddern It is certified that error appears in the above—identified patent and that said Letters Patent is hereby corrected as shown below:

Column 2, line 15 "polyethelene" should read --polyethylene--
Column 2, line 52 "say" should read --, for example,--
Column 2, line 55 "say" should read --, for example,--
Column 3, line 29 "6" should read --6'--
Column 5, line 20 "Construction" should read --Construction--
Column 5, line 22 "Embossing Pattern" should read --Embossing Pattern--
Column 5, line 23 "Pulp/Poly" should read --Pulp/Poly--
Column 5, line 36 "White Spirit" should read --White Spirit--
Column 5, line 40 "Oil Capacity    448    366    330" should read --Oil Capacity--
Column 6, line 4 "Cap Suction    %" should read --Cap Suction    %    448    366    330--
Column 6, line 5, "Lint" should read --Lint--

Signed and Sealed this

Thirtieth Day of July, 1991

Attest:

HARRY F. MANBECK, JR.

Attesting Officer

Commissioner of Patents and Trademarks